March 14, 1967 YUJIRO YAMAMOTO 3,309,610
MULTI-LAYER SOLID STATE METER HAVING ELECTROLUMINESCENT
INDICATION, BREAKDOWN DIODES AND CONSTANT-CURRENT
CONTROLLING ELEMENTS Filed May 28, 1963 5 Sheets-Sheet 1

INVENTOR.
YUJIRO YAMAMOTO

BY Sidney Magnus

AGENT

March 14, 1967  YUJIRO YAMAMOTO  3,309,610
MULTI-LAYER SOLID STATE METER HAVING ELECTROLUMINESCENT
INDICATION, BREAKDOWN DIODES AND CONSTANT-CURRENT
CONTROLLING ELEMENTS
Filed May 28, 1963  5 Sheets-Sheet 2

INVENTOR.
YUJIRO YAMAMOTO
BY Sidney Magnus
AGENT

United States Patent Office 3,309,610
Patented Mar. 14, 1967

3,309,610
MULTI-LAYER SOLID STATE METER HAVING ELECTROLUMINESCENT INDICATION, BREAKDOWN DIODES AND CONSTANT - CURRENT CONTROLLING ELEMENTS
Yujiro Yamamoto, Santa Ana, Calif., assignor to North American Aviation, Inc.
Filed May 28, 1963, Ser. No. 283,745
10 Claims. (Cl. 324—103)

This invention relates to a meter; and more particularly to a solid state meter that is capable of measuring either constant or varying values of voltage, including the peaks thereof.

BACKGROUND

Most prior-art electric meters have a physically-movable pointer that moves along a scale; the meter requiring a magnetic or an electrostatic field to move the pointer to its indicating position. This arrangement has several disadvantages; among them being (1) the relatively large size and weight; (2) the necessity for providing low-friction bearings that permit free movement of the pointer; (3) the necessity for shielding the meter from external fields and disturbances; and (4) the meter's susceptibility to damage when exposed to rough treatment, vibration, an adverse environment, corrosive chemicals, moisture, and the like.

OBJECTS AND DRAWINGS

It is therefore the principal object of this invention to provide an improved meter.

The attainment of this object and others will be realized from the following specification, taken in conjunction with the drawings of which FIGURE 1 shows an electrical schematic diagram illustrating the inventive concept;

DESCRIPTION OF THE INVENTION

Figure 1:
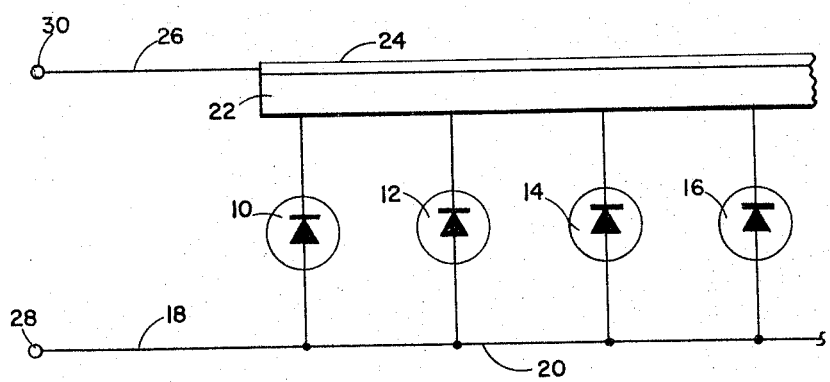

The basic inventive concept will be understood with the assistance of the schematic representation of FIGURE 1. This comprises a plurality of "diodes" 10, 12, 14, and 16; these diodes being two-element electronic components that remain non-conductive until a particular value of voltage, known as the "breakdown voltage," is impressed across them, whereupon they break down, and become conductive. The diode may comprise wires in an evacuated envelope; electrodes in a gaseous atmosphere; contiguous layers of suitable material; or may take still other forms.

For simplicity, the explanation will be presented in terms of individual diodes whose breakdown voltages differ by one volt; although, as will be shown later, this is merely a simplifying illustration.

Assume for the moment that the first diode 10 becomes conductive when one volt is impressed across it, that the second diode 12 becomes conductive when two volts are impressed across it, that the third diode 14 becomes conductive when three volts are impressed across it, and that the fourth diode 16 becomes conductive when four volts are impressed across it. Of course, additional diodes may be used. The diodes 10 to 16 of FIGURE 1 are connected in parallel between an input wire 18 and a body of electroluminescent material 22; one electrode of each diode being connected to a common connection 20, while the other electrodes are connected to spaced-apart areas of material 22. Thus there is formed a plurality of branches, each comprising a diode and an area of electroluminescent material.

As is well known, an electroluminescent material is one that glows when a suitable voltage is placed across it. Most electroluminescent materials require an A.C. voltage in order to produce light; but some of them glow when exposed to a suitable value of D.C. voltage.

The upper surface of electroluminescent material 22 has a contiguous, conductive film 24 has is electrically connected to a second input wire 26; input wires 18 and 26 being connected to respective input terminals 28 and 30.

The arrangement of FIGURE 1 operates as follows: Assume that two volts are applied between input terminals 28 and 30. Diode 10, as was pointed out above, becomes conductive when one volt is applied across it. It therefore becomes conductive; whereupon one volt is impressed across the diode, while the remaining one volt is impressed across the electroluminescent material 22. This material therefore glows in the area just above diode 10.

None of the other diodes become conductive, because they require two volts or more to become conductive; and therefore the other areas of the electroluminescent material remain dark.

Assume now that three volts is applied between input terminals 28 and 30. Diode 10 becomes conductive as previously explained, and one volt is impressed across the diode, while the remaining two volts are impressed across the associated area of the electroluminescent material. Diode 12 also becomes conductive, and in this case two volts are impressed across diode 12, while the remaining one volt is impressed across the electroluminescent material above it. As a result, two adjacent portions of the electroluminescent material are caused to glow.

Diodes 14 and 16 still remain non-conductive, because the applied voltage has not reached their breakdown value; and therefore the areas of the electroluminescent material associated with them remain dark.

Assume now that four volts is placed across input electrodes 28 and 30. Under this condition diodes 10, 12, and 14 all become conductive, and apply voltage across the electroluminescent material; and the three adjacent areas of electroluminescent material 22 begin to glow.

If five volts or more is impressed across terminals 28 and 30, all four of the diodes become conductive, and the entire area of electroluminescent material 22 glows.

If conductive film 24 is opaque, the glowing electroluminescent material 22 may be viewed from the side or edge thereof, whereby a thin streak of glowing material may be seen; but it is preferable that electroluminescent be viewed from above, as this would present a broad glowing area. This result may be achieved by making conductive film 24 transparent, as for example, using an extremely thin film of metal, or a glass plate whose undersurface is coated by a transparent conductive material such as tin oxide.

Resistances may be inserted into the circuit, if desired, to limit the voltage applied to the electroluminescent material.

It may thus be seen that the magnitude of the input voltage applied across input terminals 28 and 30 is indicated by either the amount or length of glowing area, and more particularly by the position of the division line between glowing and non-glowing portions of the electroluminescent material.

Figure 2:
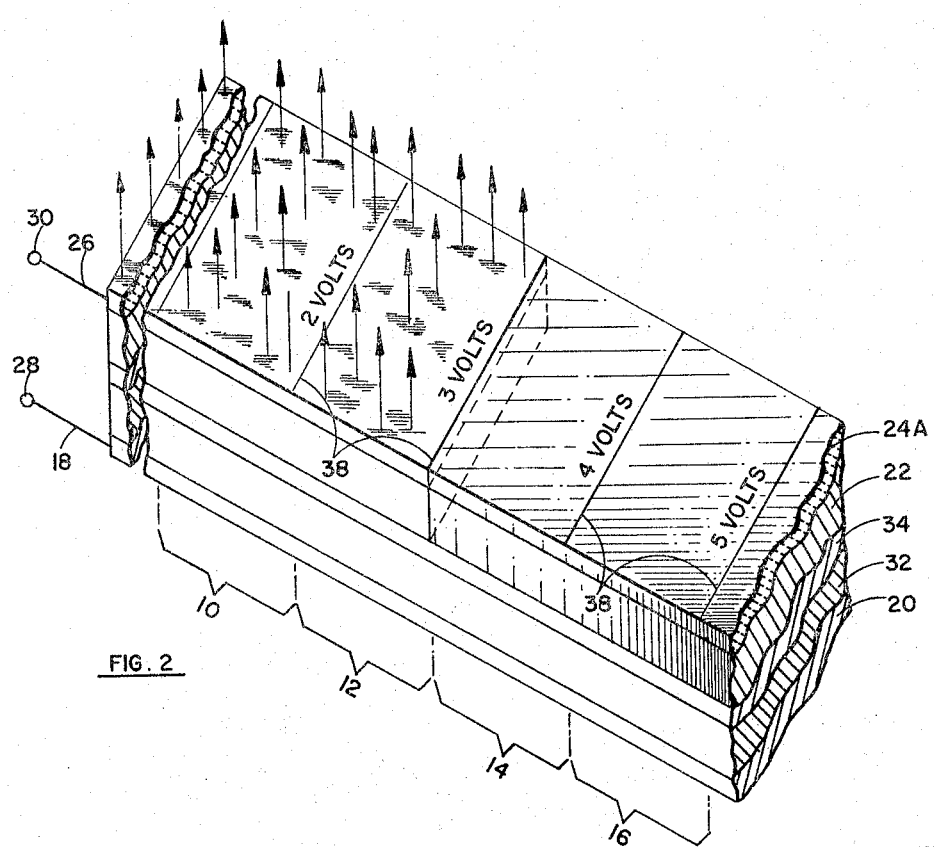
FIGURE 2 shows a physical structure embodying the inventive concept.

Whereas FIGURE 1 is a schematic electrical representation, FIGURE 2 shows a pictorial view of a meter constructed in accordance with the principles explained above.

It will be helpful to know that the breakdown voltage of the usual diode is usually a relatively gradual effect. A "zener" diode, however, is a diode formed of particular materials that give a very abrupt breakdown characteristic that is particularly desirable under some conditions. A zener diode may comprise two contiguous surfaces of suitable materials.

In FIGURE 2, layer 20 is a conductive layer that applies the input voltage to the entire bottom surface of the device; and the two layers 32 and 34 are suitable materials that act in concert to produce adjacent, different-valued breakdown-voltage zener diodes, as indicated by the brackets 10, 12, 14, and 16, which correspond to the previously-discussed diodes. The breakdown voltage of such diode layer may vary linearly from one end to the other or non-linearly, such as in discrete steps, for example. Layer 22 is the previously-described electroluminescent material; and layer 24A is preferably a transparent conductive film as explained above, and has suitable index marks 38.

The device of FIGURE 2 operates in the same manner as the schematic representation of FIGURE 1. Assume that three volts are applied across input terminals 28 and 30. Under these conditions, the two lower-valued zener diodes 10 and 12 become conductive in accordance with the above-discussed principles, and cause light to be produced in the first two areas of electroluminescent material 22, as indicated.

It will be realized that the structure of FIGURE 2 is inherently capable of indicating much finer gradations than one volt, depending upon the difference between the breakdown-values of adjacent zener diodes 10, 12, 14, 16, etc.; whereupon the individual glowing areas associated with the diodes would be quite small.

Being a solid-state device, without moving parts or an evacuated volume, the voltmeter of FIGURE 2 may be extremely small in height and width, and may have a length siutable for the voltages to be measured. Moreover, the structure is immune to vibration, external fields, etc., and may be enclosed in suitable plastics to protect it from moisture, chemicals, and other adverse environments.

In use, a plurality of meters such as illustrated in FIGURE 2, may be positioned vertically to simulate a bar graph, or chart. Alternatively a plurality of individual meters may be suitably positioned in a vertical orientation so that under normal conditions the lighted portion of each is below a mask, but as soon as a predetermined condition or a danger exists, the lighted portion increases and becomes visible above the mask. In this way an operator or a pilot need merely look for the glowing area that is exposed above the mask, and thus be advised immediately if any portion of the equipment is not operating satisfactorily—without the necessity of having to read a large number of dials.

The devices discussed in connection with FIGURES 1 and 2 have the characteristic that each branch circuit including a diode takes a progressively larger amount of current as the input voltage increases. This has several effects. The first effect is that the various areas of the electroluminescent material tend to glow with different intensities. A second effect is that the input source "sees" a different resistance for each value of input voltage. There are times when these effects may be undesirable; and the schematic diagram of FIGURE 3 shows how this characteristic may be eliminated.

Figure 3:
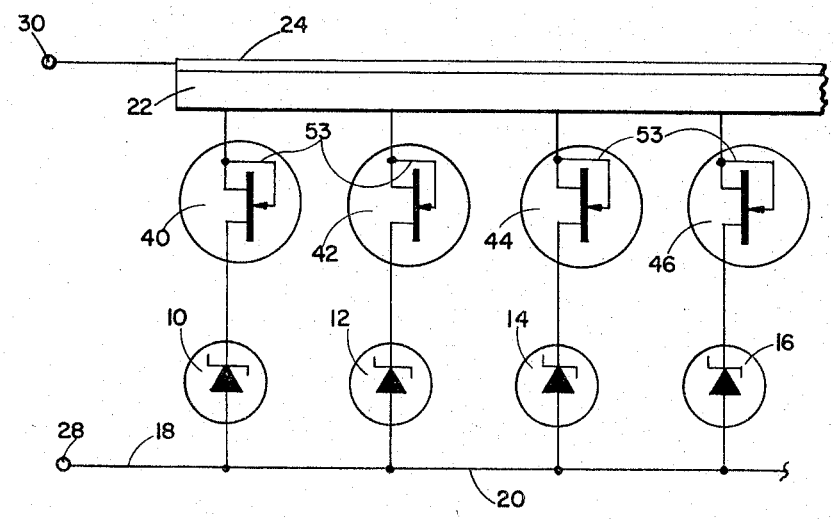
FIGURE 3 shows another electrical schematic diagram illustrating an improvement of the invention.

FIGURE 3 is similar to FIGURE 1 except that current-limiting members, such as "pinch" or "field effect" transistors 40, 42, 44, and 46 have been inserted in each branch in series with respective zener diodes 10, 12, 14, and 16. Pinch transistors and their operation are described in numerous publications, such as "Transistor Technology," F. J. Biondi, volume II, chapter 9; and "Transistor Electronics," DeWitt and Rossoff, page 332.

Pinch transistors have the characteristic that they may be operated in such a manner that they take the same amount of current regardless of how much voltage is applied across them. Use of such pinch transistors as set forth in the schematic diagram of FIGURE 3 permits the circuit to have a constant input resistance.

As an illustration of this constant input resistance, assume, for example, that a constant bias voltage equal to the breakdown voltage (1 volt in the example of FIG. 3) of first diode 10 is connected in series with the input voltage being measured. Then when one volt of input voltage is applied, a first portion of the meter becomes conductive; and current flows through the first branch comprising the first diode, the first pinch transistor, and the first portion of electroluminescent material, as previously explained. This means that the input resistance is $V/I_1$; where V is the input voltage, and $I_1$ is the current flowing through the first branch.

If the input voltage is now doubled to two volts, the second branch also becomes conductive, and the overall resistance becomes $2V/(I_1+I_2)$, where 2V is the input voltage, and $I_1$ and $I_2$ are the currents flowing through the first two branches of the circuit. Since the pinch transistors are identical, $I_1=I_2$; the input resistance is $2V/2I_1$, or $V/I_1$, the same value as for the original case.

If the input voltage is increased to three volts, the input resistance becomes $$3V/(I_1+I_2+I_3)=3V/3I_1=V/I_1$$

the same input resistance as in the first two cases.

If the input voltage is increased to four volts, the relation becomes $$4V/(I_1+I_2+I_3+I_4)=4V/4I_1=V/I_1$$

again the same input resistance as in the preceding cases.

This is an important consideration, because it means that the source of input voltage "sees" the same input resistance, $V/I_1$, which does not vary with the value of input voltage.

Figure 4:
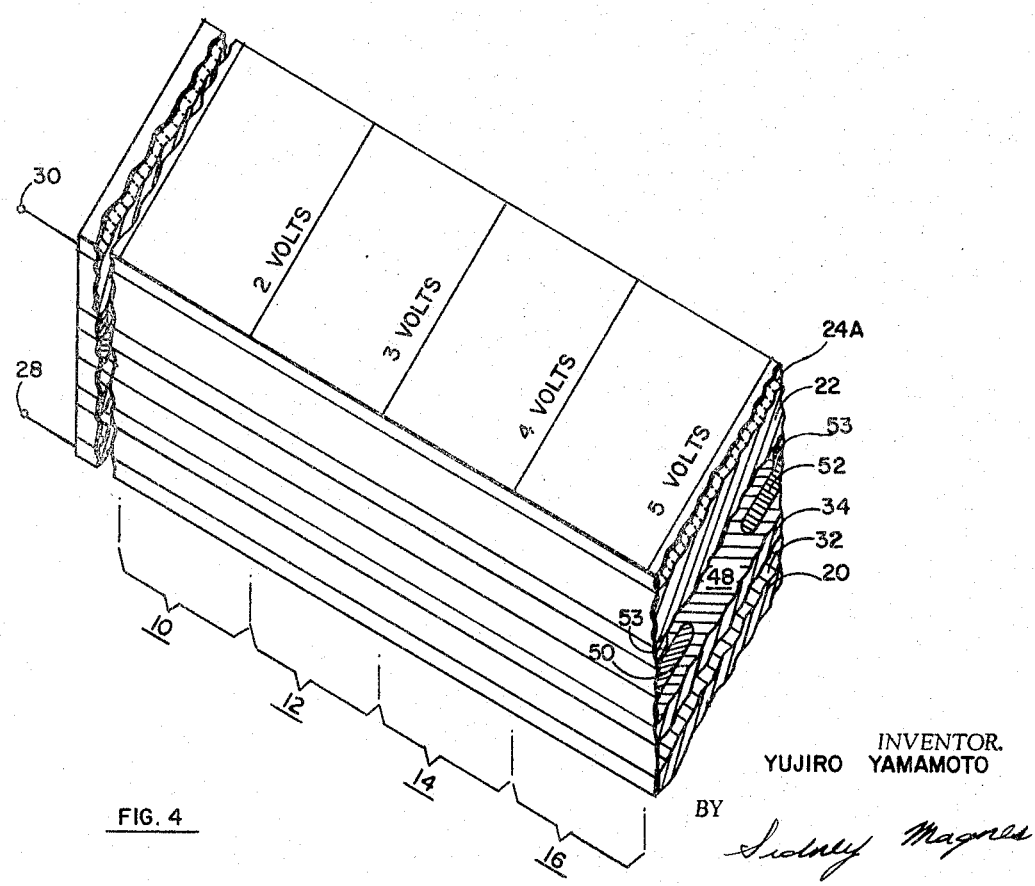
FIGURE 4 shows another physical structure incorporating the specific concept illustrated in FIGURE 3.

FIGURE 4 shows a device wherein an additional layer 48 has been added to form the body of a pinch transistor. Bodies 50 and 52 have been added to form the gate electrodes of the pinch transistor; and portions 53 are the electrical connections to the gate electrodes.

In operation, electrical current flows through the meter between the lower and upper conductive films 20 and 24A; the pinch transistors 48, 50, 52 providing the described constant input resistance.

The device shown in FIGURES 1–4 are suitable for a direct voltage having a given polarity, and—by reversing the diodes and the pinch transistor—may be made suitable for a direct voltage having the opposite polarity. However, due to the characteristics of the diodes and the pinch transistors, these devices are unsuitable for A.-C. operation. Another configuration is therefore necessary for A.-C. operation; this configuration being shown schematically in FIGURE 5, and pictorially in FIGURE 6.

Figure 5:
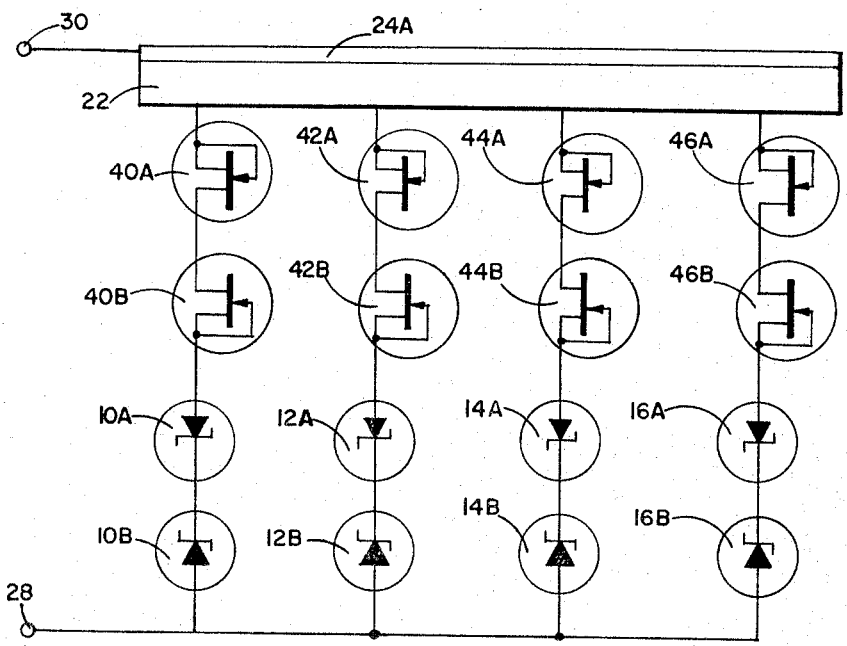
FIGURE 5 shows an electrical schematic diagram illustrating the invention as adapted for use in measuring alternating electrical signals.

In FIGURE 5, each branch comprises two back-to-back zener diodes, 10A, 10B; 12A, 12B; 14A, 14B; 16A, 16B; and two back-to-back pinch transistors, 40A, 40B; 42A, 42B; 44A, 44B; 46A, 46B. Now, regardless of the polarity of the applied voltage, or whether the applied voltage is A.C. or D.C., one of the diodes and one of the pinch transistors operate in their characteristic manner; while the other zener diode and the other pinch transistor merely act as closed switches.

Figure 6:
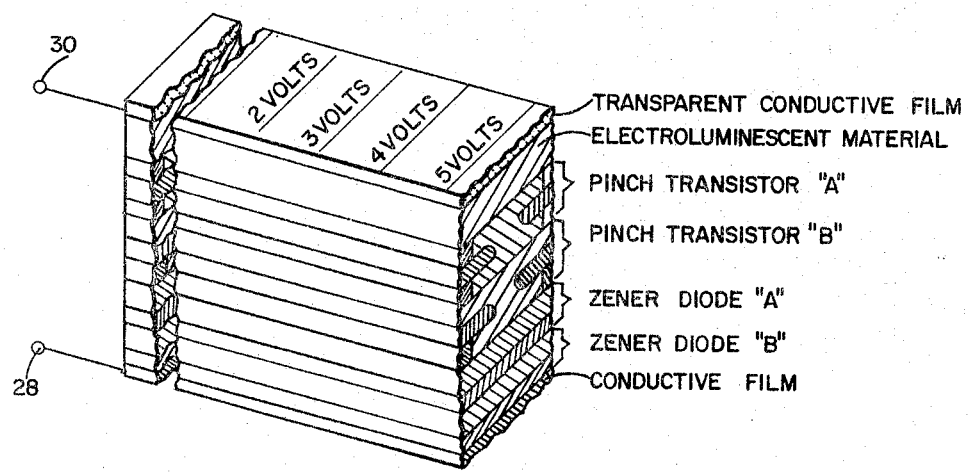
FIGURE 6 shows another physical structure useful in measuring alternating electrical signals.

FIGURE 6 shows a physical arrangement that embodies the electrical characteristics of FIGURE 5.

The device as thus far described indicates, by varying areas of luminescence, the instantaneous voltage that is being applied to the input terminals, even though the voltage fluctuates from moment to moment.

If a short-duration momentary, or "transient," voltage is applied to the input terminals, a portion of the device lights up momentarily; and at the end of the transient voltage the device again turns dark. Since the transient voltage may last only a small fraction of a second, the momentary illumination would not be measurable.

However, at times it is desirable to measure either the magnitude of the transient voltage, or the peak magnitude of the largest voltage that occurs in a given interval of time.

Figure 7:
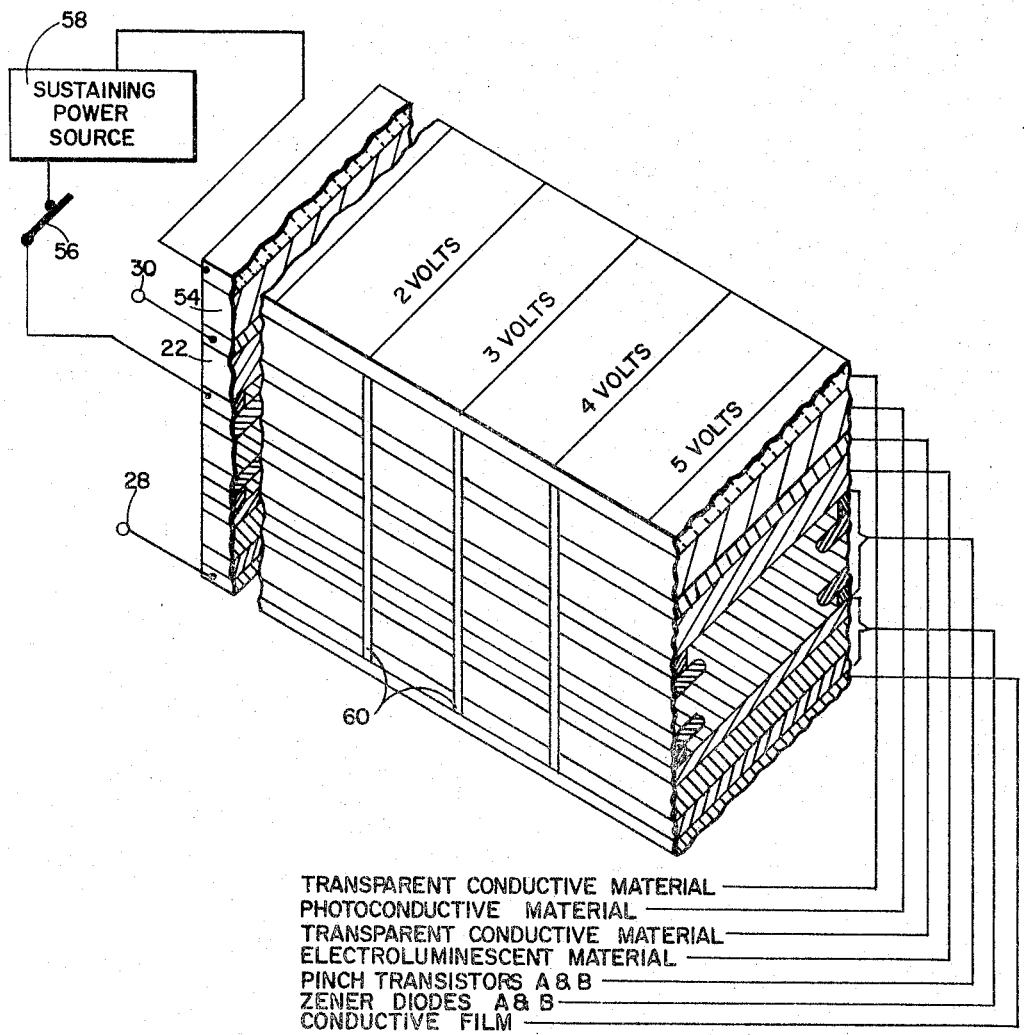
FIGURE 7 shows a physical structure for measuring transient values.

This result can be achieved by the structure shown in FIGURE 7. This structure is substantially the same as the ones previously discussed, except for the following differences. The two pinch transistors have been combined to have a single body; the two zener diodes have been combined to have three layers, rather than four; and the meter now has an additional layer 54 of transparent photoconductive material—that is, material that has a low electrical resistance when it is illuminated, and has a high electrical resistance when in the dark.

The peak reading device of FIGURE 7 operates as follows: When an input voltage is applied to input terminals 28 and 30, a portion of the electroluminescent material 22 glows as previously explained. The light from the glowing portion of the electroluminescent material 22 passes through the transparent conductive material above it, and illuminates the portion of the photoconductive material 54 directly above that; and this area only of the photoconductive material therefore assumes its low electrical resistance state. As a result, sustaining power source 58 applies an electrical potential across the series-connected glowing portion of the electroluminescent material 22 and the low-resistance portion of photoconductive material 54 directly above it. This sustaining potential maintains the glowing portion of the electroluminescent material in its glowing state; which in turn maintains the low-resistance illuminated portion of the photoconductive material in its low-resistance state. As a result of this optical feedback, the electroluminescent material 22 continues to glow, even after the input voltage has been removed from input terminals 28 and 30.

In this way a momentary transient voltage causes a portion of the device to glow in accordance with the magnitude of the input voltage; and the optical feedback causes this portion of the device to continue to glow after the transient input voltage has disappeared.

The continuous glow due to the optical feedback is maintained until reset switch 56 is opened. At that time the optical feedback circuit is broken; the electroluminescent material ceases to emit light; and the photoconductive material resumes its high-resistance state. If switch 56 is now closed, the device is ready for another transient input voltage to be applied to input terminals 28 and 30.

Under some conditions it may be desirable to slot the structure by means of closely spaced slots such as 60. These slots can be formed by any suitable means, such as cutting by a very fine saw, and filling them with an opaque insulating cement that insulates the separate sections from each other, and prevents undesired optical feedback between various portions of the device.

Figure 8:
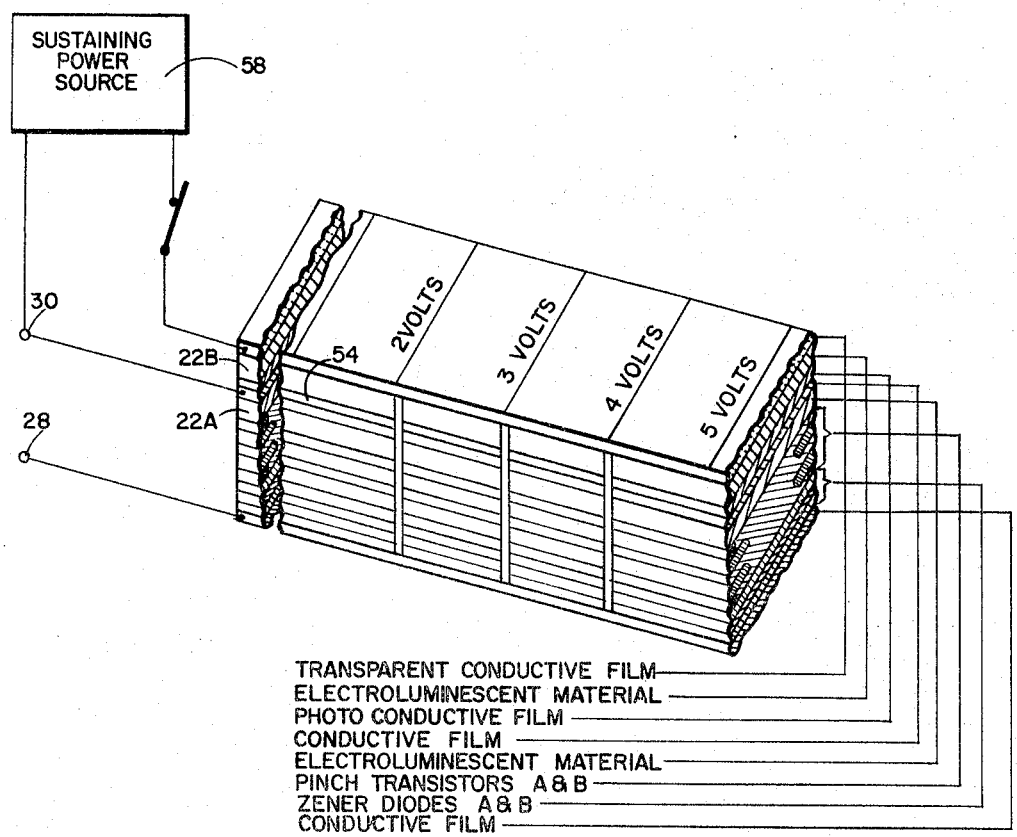
FIGURE 8 shows still another physical structure for measuring transient values.

FIGURE 8 shows another structure that may be used when it is desired to utilize an opaque photoconductive material; this structure having an additional layer 22B of electroluminescent material. In operation, the lower layer 22A of electroluminescent material glows in response to the input voltage; and illuminates the photoconductive material 54, which thereupon assumes its low-resistance state. The output of sustaining power source 58 is therefore applied across the series-connected low-resistance photoconductive layer 54 and the upper layer 22B of electroluminescent material, which therefore glows, and continues to glow even after removal of the input signal applied to the input terminals. In this arrangement, the glow from the lower layer 22A of electroluminescent material is blocked from view by the opaque layer 54 of photoconductive material; but the glow from the upper layer 22B of electroluminescent material is not blocked by the opaque layer 54, but is visible through the uppermost transparent conductive film.

As may be realized, the operation of the disclosed meter depends in part upon a plurality of diodes that have slightly-different breakdown voltages.

It was previously indicated that a diode may comprise two contiguous surfaces of suitable materials. If each of these two materials are homogenous, the breakdown voltage is the same at all portions of their contiguous surfaces; whereas if one or both of the materials vary progressively in a predetermined manner, the breakdown voltage will be different for different portions of the contiguous surfaces.

Thus, in FIGURE 2, layer 32 and/or 34 have progressively different characteristics, so that adjacent portions of the diodes 32–34 have progressively-higher breakdown voltages. The same is true of the common layer comprising diodes A and B of FIGURE 7.

While the illustrations and explanation have been presented in terms of discrete diodes 10, 12, 14, 16, etc., it is apparent that the diode is a continuous one, with adjacent areas having different breakdown voltages.

In this way, the individual branches of the meter become conductive upon the application of slightly higher input voltages.

Since the disclosed device is a solid-state device that comprises layers of material, it may be produced in various ways, for example by sequential deposition of layers of material; by crystal growth; by diffusion techniques; etc.

For example, a substrate may have a first layer of suitable material formed thereon, followed by a second layer of another material, followed in turn by another layer of suitably-doped material; and these various layers may be of pure or of suitably-doped material. In this way various layers of materials having desired properties may be produced.

One crystal-growth technique slowly withdraws the growing crystal from a bath of liquid material that has suitable additives introduced into it. By sequentially doping the liquid, the sequential layers take the desired form.

The zener layers may be formed by slightly tilting the structure so that adjacent portions of the zener layer are subsequently withdrawn from the liquid as the liquid is being increasingly or decreasingly doped. Alternatively, or in combination, the zener diode layers, the gate electrodes, and the connections thereto may be formed by the diffusion process, wherein the desired additives are selectively diffused into desired portions of the device.

Although the invention has been described and illustrated in detail, it is to be clearly understood that the same is by way of illustration and example only, and is not to be taken by way of limitation; the spirit and scope of this invention being limited only by the terms of the appended claims.

I claim:
1. The combination comprising
   a strip of electroluminescent material;
   a plurality of constant-current-controlling members;
   a plurality of diodes having different breakdown voltages; and
   means for series-connecting a diode, a member of said plurality, and an area of said strip of said electroluminescent material—whereby input signals of different magnitudes cause various portions of said strip to glow, said constant-current-controlling members acting to provide a combination having a substantially constant input impedance.

2. A multi-layer combination for indicating the magnitude of a voltage comprising
   a first layer of electroluminescent material disposed adjacent to and extending substantially the length of a layer of material defining a pinch transistor;
   two contiguous layers of material defining a diode, adjacent portions of said diode having different breakdown voltages, said contiguous layers disposed adjacent to and separated from said first layer by said pinch transistor layer; and
   means for applying said voltage between said first layer and said diode.

3. A multi-layer combination comprising in order
   a first layer of transparent conductive material;
   a first layer of electroluminescent material;
   a layer of material defining a pinch transistor;
   two contiguous layers of material defining a zener diode, adjacent portions of said zener diode having different breakdown voltages;
   a second layer of conductive material; and
   means for applying an input voltage between said layers of conductive material.

4. A multi-layer combination comprising in order
   a layer of photoconductive material;
   a layer of electroluminescent material;
   a layer of material defining a pinch transistor;
   two contiguous layers of material defining a diode, adjacent portions of said diode having different breakdown voltages; and
   means for applying a voltage to be measured between said electroluminescent layer and said diode.

5. A multi-layer combination comprising in order
   a first layer of transparent conductive material;
   a layer of transparent photoconductive material;
   a layer of electroluminescent material;
   a layer of material defining a pinch transistor;
   two contiguous layers of material defining a zener diode, adjacent portions of said zener diode having different breakdown voltages;
   a second layer of conductive material;
   means for applying an input voltage between said layers of conductive material; and
   means for applying a sustaining voltage across said layer of photoconductive material and said layer of electroluminescent material whereby said input voltage causes a selected portion of said electroluminescent material to glow, and said sustaining voltage causes said selected portion of electroluminescent material to continue to glow after said input voltage has been removed.

6. A multi-layer combination comprising in order
   a first layer of transparent conductive material;
   a first layer of electroluminescent material;
   a first layer of photoconductive material;
   a second layer of conductive material;
   a second layer of electroluminescent material;
   two contiguous layers of material defining a diode, adjacent portions of said diode having different breakdown voltages;
   a third layer of conductive material and means for applying a voltage to be measured across said second and third layers of conductive material, and wherein said photoconductive layer cooperates with said first and second conductive layers across which a sustaining voltage is applied and said first electroluminescent layer to provide sustained illumination for measuring transient voltages.

7. A multi-layer combination comprising in order
   a first layer of transparent conductive material;
   a first layer of electroluminescent material;
   a first layer of photoconductive material;
   a second layer of conductive material;
   a second layer of electroluminescent material;
   a layer of material defining a pinch transistor;
   two contiguous layers of material defining a zener diode, adjacent portions of said zener diode having different breakdown voltages;
   a third layer of conductive material;
   means for applying an input voltage between said layers of conductive material; and
   means for applying a sustaining voltage across said first and second layers of conductive material.

8. The combination of claim 7 including means for enabling and disabling said sustaining-voltage-applying means.

9. The combination comprising
   a strip of electroluminescent material;
   an input terminal;
   a plurality of discrete like-poled zener elements each connected across said input terminal and a progressively spaced portion of said material, each of said zener elements having a progressively higher breakdown characteristic corresponding to the progressive spacing of the associated spaced portion of said material;
   means for applying a voltage to be measured across said terminal and said material to cause a portion of said material initially to glow;
   a film of photoconductive material in optical and electric circuit with said electroluminescent material; and
   a source of sustaining current connected across said electroluminescent material and said photoconductive material, whereby the cooperation of said photoconductive material with said initially glowing portion of said electroluminescent material provides an improved conductive path for such sustaining current to said initially glowing portion of said electroluminescent material.

10. The combination of claim 9 further comprising a plurality of current limiting means, each in series with a mutually exclusive one of said zener elements.

References Cited by the Examiner

UNITED STATES PATENTS

| | | | |
|---|---|---|---|
| 2,094,645 | 10/1937 | Foulke | 324—122 |
| 2,818,531 | 12/1957 | Peek | 315—166 |
| 3,112,405 | 11/1963 | Bowerman | 313—108.1 |
| 3,134,055 | 5/1964 | Cronier | 307—88.5 |
| 3,141,107 | 7/1964 | Wasserman | 313—108 |
| 3,149,281 | 9/1964 | Lieb | 324—122 X |

WALTER L. CARLSON, *Primary Examiner.*

J. J. MULROONEY, *Assistant Examiner.*